Oct. 2, 1934.   R. SCHULZE ET AL   1,975,482
PROCESS OF PRODUCING BERYLLIUM FLUORIDE
Filed Aug. 11, 1932
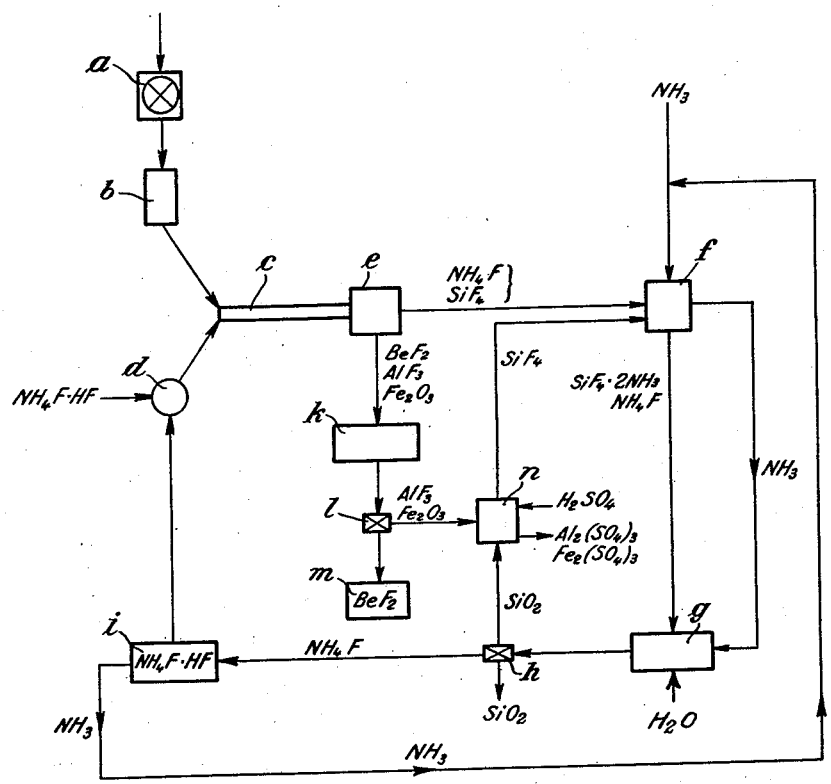
Inventors
RUDOLF SCHULZE
WALTER BRAUSE.
By Hauff & Harland
Attorneys.

Patented Oct. 2, 1934

1,975,482

UNITED STATES PATENT OFFICE 1,975,482

PROCESS OF PRODUCING BERYLLIUM FLUORIDE

Rudolf Schulze, Bitterfeld, and Walter Brause, Leipzig, Germany, assignors to I. G. Farbenindustrie Aktiengesellschaft, Frankfort-on-the-Main, Germany Application August 11, 1932, Serial No. 628,346
In Germany August 13, 1931

2 Claims. (Cl. 23—16)

The present invention relates to improvements in the production of beryllium compounds and more particularly to a process for the production of beryllium fluoride by decomposing beryl with ammonium fluoride in a continuous operation.

Gibson has described a process for decomposing beryl by heating that substance with about three times the theoretically required amount of ammonium fluoride in an upright vessel for a considerable time, the silica present being thereby volatilized as silicon tetrafluoride and beryllium fluoride remaining in association with the fluorides of the other metals present. The process was designed for laboratory use and has not, so far, been applied on a technical scale, preference being given to decomposition by sodium silicofluoride. The probable reason is that, in decomposing with ammonium fluoride, the bulk of the latter is consumed in the formation of silicon tetrafluoride and aluminium fluoride, which are by-products for which it is difficult to find employment, and that the considerable excess of ammonium fluoride necessary for the Gibson process also renders the recovery thereof a troublesome and difficult matter.

According to the process of the present invention, beryl is decomposed with ammonium fluoride in a continuous operation, in which the whole of the fluorine that is not combined with the beryllium is recovered as ammonium fluoride and returned to the cycle of the process.

The decomposition of beryl in accordance with the invention can be carried out, equally well, with either neutral or acid ammonium fluoride. However, since the recovery of the neutral salt is the more difficult, owing to its tendency to decompose at temperatures above 40° C., the operation is preferably performed with the acid salt. At the same time the property possessed by the acid salt, of first passing into the liquid phase when heated, can be advantageously utilized.

Experiments in carrying out the decomposition by heating a briquetted mixture of beryl and ammonium fluoride in a rotary furnace, have shown that, as the heating progresses the charge material agglutinates, a circumstance that renders its treatment extremely difficult, if not impracticable. The method adopted has therefore been to heat the ammonium fluoride separately in a vaporizer disposed in front of the rotary furnace, and pass it in the form of vapour into the rotary furnace in which the beryl, ground extremely fine, is kept constantly in motion. The employment of the preliminary vaporizer enables the vaporizing of the ammonium fluoride to be controlled, so as to adapt it in the most suitable manner to the amount of beryl actually fed into the rotary furnace. On the other hand, the retention of the pulverulent character of the reaction material throughout the entire process, combined with the thorough intermingling of the material with the gaseous ammonium fluoride, is beneficial to the course of the reaction. On this account, the employment of 10–20 percent of fluoride above the theoretical quantity, in conjunction with a period of one hour for the passage of the raw material through the furnace at a reaction temperature of 350–600° C. is sufficient for the complete volatilization of the silica. The reaction proceeds in accordance with the equation:

$$3BeO.Al_2O_3.6SiO_2+18NH_4F.HF=$$
$$3BeF_2+2AlF_3+6SiF_4+18NH_3+18H_2O.$$

The waste gases—consisting substantially of $SiF_4$ and the excess of ammonium fluoride—formed during the reaction subsequent to the initial splitting-off of ammonia, are now treated with gaseous ammonia in excess, and at the same time cooled to about 150° C. and lower, by which means the $SiF_4$ is deposited in the form of a solid compound, $SiF_4.2NH_3$, together with the excess of ammonium fluoride. The deposited solids are separated by suitable means, such as mechanical or electrical dust filters in particular, and are worked up into ammonium fluoride in known manner. This is preferably effected by passing them into water, treating with an excess of ammonia, removing the precipitated silica and concentrating or spray-drying the solution. In this manner two-thirds of the ammonium fluoride consumed in the decomposition process is recovered, in accordance with the equation:

and returned to the vaporizer.

The almost chemically pure silica resulting from this decomposition forms an excellent raw material for the production of silica gel, water-glass and the like.

The mixture of beryllium fluoride, aluminium fluoride and ferric oxide left behind from the decomposition treatment is worked up, in known manner, by extracting the beryllium fluoride with water and concentrating it to beryllium oxyfluoride, or subjecting it to further conversion into beryllium hydroxide or beryllium salts. The aluminium fluoride contained in the dried residue—which latter consists chiefly of aluminium fluoride and ferric oxide—is also worked up into ammonium fluoride. A suitable method consists in first treating the residue in known manner, with concentrated sulphuric acid and added silica, so as to liberate $SiF_4$, which is then united with the waste furnace gases and is worked up, in association therewith, into ammonium fluoride, by reaction with ammonia.

The neutral ammonium fluoride formed in the first stage of regeneration is then converted in known manner, into the acid salt by heating, the gaseous ammonia split off in this operation being employed for the precipitation of the $SiF_4$ contained in the waste gases and resulting from the decomposition of the aluminium fluoride. In this manner it is also possible to return into the circulation the whole of the ammonia gas required in the process, so that only the ordinary working losses are sustained.

Example

The annexed chart forming part of this specification gives a diagrammatical illustration of the course of the decomposition process and that of the circulation of the substances employed in said process. The beryl, ground to the state of dust in the mill $a$, drops first into a silo $b$ from which it is fed, in measured amount, into the iron rotary furnace $c$, which is heated to about 500° C. Vaporized acid ammonium fluoride, in an excess of about 20 percent over the amount corresponding to the charge of beryl, is passed from the vaporizer $d$ into the rotary furnace. The movement of the charge through the furnace is controlled in such a manner that, after being treated for about an hour, the decomposed charge issues into the chamber $e$, which is heated to about 400° C., and there separates from the reaction gases. These latter are passed into another chamber $f$, which is cooled to about 150° C., and into which ammonia gas is simultaneously admitted, so that not only is the excess of ammonium fluoride employed for the reaction, condensed, but also the $SiF_4$ is precipitated, in the solid state, by taking up ammonia. The solid constituents are now passed into the agitator $g$, which is continuously supplied with water and into which the gaseous ammonia left unconsumed during the precipitation is also admitted. Silica is thereby precipitated and is separated from the resulting solution in the filter $h$. Finally, the solution is concentrated in the evaporator $i$ and is worked up into acid ammonium fluorides, which is returned to the vaporizer $d$, whilst the excess of gaseous ammonia, and that split off from the neutral fluoride, is passed into the chamber $f$.

The solid decomposition residues, consisting of $BeF_2.AlF_3$ and $Fe_2O_3$, are first leached with water in the agitator $k$ and separated, in the filter $l$, into a solution containing $BeF_2$ and a solid residue consisting of $AlF_3$ and $Fe_2O_3$. The solution is worked up into $BeF_2$ in the evaporator $m$, whilst the residues are treated at $n$ with sulphuric acid and a portion of the silica from the filter $h$, gaseous $SiF_4$ (which is united with the furnace gases and led into the chamber $f$) being split off, and aluminium sulphate and ferric sulphate formed.

The yield of beryllium fluoride is about 90-95 perc. of the theoretical quantity.

We claim:—

1. A continuous cyclic process of producing beryllium fluoride by decomposition of beryl with ammonium hydrofluoride, which comprises introducing beryl and ammonium hydrofluoride into a reaction vessel under reacting conditions, separating the solid residues of the reaction from the gaseous reaction products, treating the gaseous reaction products issuing from the reaction vessel with ammonia at temperatures not exceeding about 150° C., treating the solid products of such reaction with water and a further quantity of ammonia whereby to form silica and a solution of ammonium fluoride, converting the ammonium fluoride solution to ammonium hydrofluoride, reintroducing the ammonium hydrofluoride to the beryl-treating step, recovering beryllium fluoride from the solid residue produced by reaction between the beryl and ammonium hydrofluoride, subjecting the remaining solid residues to an acid treatment adapted to convert the aluminium fluoride contained therein into gaseous silicon tetra-fluoride and a solid aluminium compound and combining the silicon tetrafluoride with said gaseous reaction products.

2. A continuous cyclic process of producing beryllium fluoride by decomposition of beryl with ammonium hydrofluoride, which comprises introducing beryl and ammonium hydrofluoride into a reaction vessel under reacting conditions, separating the solid residues of the reaction from the gaseous reaction products, treating the gaseous reaction products issuing from the reaction vessel with ammonia at temperatures not exceeding about 150° C., treating the solid products of such reaction with water and a further quantity of ammonia whereby to form silica and a solution of ammonium fluoride, converting the ammonium fluoride solution to ammonium hydrofluoride by evaporation to dryness, reintroducing the ammonium hydrofluoride to the beryl-treating step, leaching with water the solid residue produced by reaction between the beryl and ammonium hydrofluoride so as to obtain a solution of beryllium fluoride, and a residue comprising aluminium fluoride and ferric oxide, treating the residue with sulphuric acid and at least part of the silica obtained from the gaseous reaction products whereby to form gaseous silicon tetrafluoride and sulphates of iron and aluminium and combining the silicon tetrafluoride with said gaseous reaction products.

RUDOLF SCHULZE.
WALTER BRAUSE.